US009613541B1

(12) United States Patent
    Badilla-Bradford

(10) Patent No.: US 9,613,541 B1
(45) Date of Patent: Apr. 4, 2017

(54) METHOD AND APPARATUS FOR LEARNING TO PLAY A STRINGED INSTRUMENT

(71) Applicant: Dylan J. Badilla-Bradford, New Orleans, LA (US)

(72) Inventor: Dylan J. Badilla-Bradford, New Orleans, LA (US)

( * ) Notice: Subject to any disclaimer, the term of this patent is extended or adjusted under 35 U.S.C. 154(b) by 0 days.

(21) Appl. No.: 14/993,255

(22) Filed: Jan. 12, 2016

(51) Int. Cl.
    *G09B 15/00*    (2006.01)
    *G10D 3/06*     (2006.01)
    *G09B 15/02*    (2006.01)

(52) U.S. Cl.
    CPC ......... *G09B 15/004* (2013.01); *G09B 15/026* (2013.01); *G10D 3/06* (2013.01)

(58) Field of Classification Search
    CPC ... G10D 3/06; G10D 1/08; G10D 1/00; G09B 15/003; G10H 1/0016; G10H 2220/051; G10H 2220/301
    USPC .................................. 84/293, 312 R, 314 R
    See application file for complete search history.

(56) References Cited

U.S. PATENT DOCUMENTS

| 3,153,970 | A | 10/1964 | Mulchi |
| 5,373,768 | A * | 12/1994 | Sciortino ................ G10D 3/00 362/253 |
| 5,920,023 | A | 7/1999 | Ravagni et al. |
| 6,218,603 | B1 | 4/2001 | Coonce |
| 7,408,105 | B2 | 8/2008 | Murdock |
| 8,399,756 | B1 | 3/2013 | Trent et al. |
| 8,704,066 | B2 | 4/2014 | Jacobsen |
| 8,841,531 | B2 | 9/2014 | Squillante |

FOREIGN PATENT DOCUMENTS

DE    102008013999    9/2009

* cited by examiner

*Primary Examiner* — Kimberly Lockett
(74) *Attorney, Agent, or Firm* — Keaty Law Firm, LLC

(57) ABSTRACT

A method and apparatus for learning to play a musical instrument, such as a guitar, by incorporating a markable, erasable surface onto the neck of the instrument such that the student may apply, as needed, removable markings to the instrument that indicate the correct finger positions for playing the instrument. The incorporation of this markable, erasable surface onto the instrument is an improved method of learning because a student is better able to place his or her fingers in the correct positions on the instrument when learning how to play the instrument.

7 Claims, 4 Drawing Sheets

METHOD AND APPARATUS FOR LEARNING TO PLAY A STRINGED INSTRUMENT

BACKGROUND OF THE INVENTION

This invention provides method and apparatus for learning to play a musical instrument, such as a guitar, by incorporating a markable, erasable surface onto the instrument that may guide a student to the correct finger positions. The incorporation of this markable, erasable surface onto the instrument is an improved method of learning because a student is better able to place his or her fingers in the correct positions on the instrument when learning how to play the instrument.

Guitars, and more generally stringed instruments, are normally comprised of sound holes, a sound box, a fretboard or fingerboard, a neck, a nut, a head, turning pegs, a bridge, and strings. The strings vibrate at one of its possible frequencies or pitches when a note is played on such a stringed, fretted instrument. The player of the instrument will press down in a particular manner on the strings to cause such a vibration, and thus the placement of the player's fingers on the strings corresponds to a particular pitch and note being played on the instrument. The player may play a variety of notes by pressing the string between different frets of the instrument before plucking the instrument and producing music.

When learning to play a fretted instrument, the student may employ a variety of learning devices to learn the correct placement of fingers on the strings of the instrument. Mnemonic devices are often used to teach students the names of sequences of notes and to memorize which notes are needed to form various "chords," which are combinations of various singular notes played at the same time. Visual cues such as fretboard diagrams are often used to teach students where to place their fingers in order to produce various notes.

Although there are a number of books, videos, and online resources devoted to providing students with visual cues needed to learn the fundamental skills required to learn a stringed instrument, most of these learning aids share a common deficiency: the fretboard patterns, note locations, or chords to be learned are printed on something other than the fretboard of the guitar itself. This forces students to expend a great deal of mental effort in order to figure out the relation between the fretboard patterns, note locations, or chords printed on the visual cue to the correct pattern on the actual instrument being played. The present invention seeks to eliminate this shortcoming by offering students the ability to print the visual cues directly to the surface of the fretboard.

A variety of devices, besides the present invention, have been employed to attempt to affix visual cues directly to the surface of the fretboard. However, all of the devices existing in the prior art have significant shortcomings, making them ineffective or otherwise unattractive to use.

Some devices have a one-piece sheet of pliable material, such as linen, that extends along the length of the guitar, featuring fret openings cut into the material that can be secured to the side of the guitar using pins or the equivalent. For example, U.S. Pat. No. 7,408,105, issued Aug. 5, 2008 to Grayson M. Murdock for "Instrument Training Device for Stringed Instruments," discloses an instrument training device for use with a stringed instrument that includes a plurality of training members. Each training member is constructed of a flexible material such as hook and loop fasteners for securing a respective training member about a fret board of a stringed instrument by releasably fastening the opposed ends together. Each training member includes indicia on a front portion thereof corresponding to chord sets or tuning schemes. The front portion is constructed of a resilient or elastic material that may be stretched across the front surface of the fret board such that the indicia thereon is situated directly beneath predetermined strings. This enables each training member to be used on stringed instruments of different sizes or widths. Each training member includes an identifier for positioning the training member at a predetermined position along a fret board.

This type of visual cue device, although it offers a means to display the correct chord positions on top of the fretboard, is cumbersome to apply. More significantly, because the training member is a one-piece sheet of material, the openings cut throughout the material must be relatively large to accommodate the openings of the frets, which are spaced and sized differently on different types of guitars. It is therefore not adaptable to all types of fretboards, and, practically speaking, limits the size of the printing space available for chord depiction. Further, because the invention is comprised of one continuous piece of material, the student must either cover the entire fretboard at once, and thus employ use of all visual cues simultaneously, or else forego using the learning device entirely. This may be problematic because in some instances it may be a more beneficial learning tool for the student to concentrate on only certain chord markings. For example, once a student masters the location of one chord, it may be best to deprive himself of this visual cue moving forward in learning the next series of chords and finger positions.

Other devices offer a sheet of adhesive material, such as cling vinyl, on which is printed a series of markers indicating the appropriate chord positions. For example, U.S. Pat. No. 5,920,023, issued Jul. 6, 1999 to Steven R. Ravagni et al. for "Stringed Instrument Finger Positioning Guide and Method for Teaching Students to Read Music," discloses a device for teaching students of stringed instruments note locations and proper finger placement on the fingerboard of the instrument. The device may be adapted for use with either a fretted or non-fretted instrument. The device comprises a sheet of autogeneously adhesive plastic, such as cling vinyl, on which is printed a series of markers indicating note locations, scales, or chords. If the device is to be applied to a fretted instrument, the device further has fret openings cut therein, adapted to engage the frets when applied to the instrument. The device is applied to the instrument by inserting it between the strings and the fingerboard, wrapping it around the neck of the instrument and adhering it onto itself along the back of the neck of the instrument.

Likewise, U.S. Pat. No. 8,399,756, issued Mar. 19, 2013 to John Trent et al. for "Guitar Strip," discloses a system for aiding in the teaching and playing of stringed instruments, allowing for easily understood, non-descript reference points. The system is a decal or series or decals or other printed thin attachable strips, depicting the notes on a given string corresponding to a given finger position. The decals are placed on the back of the neck near the top of the fretboard, or nut, allowing the player a clear view of the notes from a natural playing position, rather than having to look at the front of the fingerboard as in other systems.

Similarly, U.S. Pat. No. 8,704,066, issued Apr. 22, 2014 to David C. Jacobsen for "Removable Fretboard Stickers with Musical Indicia," discloses a device and method for teaching note locations, fretboard patterns, scales, and chords on the fingerboard of a fretted stringed instrument, such as an electric or acoustic guitar. The invention comprises a set of independently affixable fretboard adhesive labels (i.e., stickers) that adhere to the surface of the stringed instrument, using a mild adhesive so as not to damage the instrument, and a number of markings, which indicate musical indicia. The device is applied to the instrument by slipping various individual stickers between the corresponding frets and strings of the stringed instrument and affixing the stickers directly to the fretboard.

The above Ravagni, Trent, and Jacobsen systems are cumbersome to apply and alter the integrity of the fretboard by adding an extra layer of material. The student is thus reinforced with an incorrect feeling of playing the instrument and must account for this altered muscle memory when later playing the guitar without the layer of adhesive plastic. Further, because the Ravagni vinyl is pre-printed with the series of markers, the student does not have the ability to alter the markers as he progresses through learning certain chords and notes. In contrast, the present invention does not compromise the integrity of the fretboard or the student's physical perception of the correct method of playing the instrument by providing a surface that is incorporated into the surface of the instrument. The present invention further improves upon the Ravagni and Trent systems by offering an alternative that allows the student to alter the markers as he so desires, and allowing the markers to be placed on any area of the fretboard as to facilitate the best learning experience for the particular student.

A third option present in the art is to have a series of cards which can be alternately placed on the fretboard of the guitar and then withdrawn after the fingers are placed in the proper positions. For example, U.S. Pat. No. 3,153,970 issued Oct. 27, 1964 to Royce L. Mulchi for "Aid for Stringed Instruments," and discloses a series of cards, each of a size such that it can be placed on the keyboard beneath the strings and above the frets. Each card has marked thereon a series of longitudinal lines and transverse lines corresponding respectively with the portions of the strings and frets of the guitar. The card may be inserted under the strings of the guitar to rest upon the frets with one edge abutting the nut. The card is adjusted laterally to bring the longitudinal markings into coincidence with strings. When the card has the edge against the nut, the transverse lines are directly above the frets of the instrument. The card is marked to indicate the desired position of the finger with respect to the lines on the card to correspond with the correct position of the fingers on the strings in relation to the frets. The student can then place the fingers on the strings in the indicated positions on the card below the strings. Then by withdrawing the card while the fingers remain on the strings, the latter will be pressed into engagement with the adjacent frets so that the desired notes will be sounded when the strings are vibrated. The invention contemplates a series of cards, each marked to indicate the correct finger positions for a certain chord.

The Mulchi invention requires students to continually stop instrument play to remove from the fretboard the cards that were previously placed on the instrument. This drawback alone is sufficient to make these devices virtually worthless to students trying to learn long musical phrases and complex fretboard patterns. The present invention improves upon this disruptive method by allowing the student to mark finger positions directly on the fretboard surface, thereby eliminating the need to continually place cards into position and remove as needed while learning the fretboard patterns.

U.S. Pat. No. 6,218,603, issued Apr. 17, 2001 to Phillip R. Coonce, discloses an apparatus and method for a note locator of stringed instruments. The application of acoustic laws allows calculation of the location for note position indicators upon the note locator. These locations are presented in a visual format. The note locator comprises a flexible planar top and bottom surface wherein the top surface has note position indicators of color and the bottom surface has an adhesive so that it can be placed beneath the strings of the instrument along the fingerboard without interfering with the normal operation of the instrument. Fingerboard alignment indicators aid in correct placement of the note locator. The user learns correct finger placement for playing the instrument by visually identifying colors with the notes of the equitempered chromatic scale. Diatonic scale note position indicators are indicated with various distinct colors, while other half step note position indicators are indicated with a color different from that of the diatonic scale note position indicators. The Coonce method and apparatus is strictly limited to a color-coding based presentation, which may not be the best learning device for all students. Further, the present invention improves upon the Coonce method by offering maximum flexibility in the application of the markings to the fretboard, whereas the Coonce method is rigid in its application and use.

Lastly, U.S. Pat. No. 8,841,531, issued Sep. 23, 2014 to Charles E. Squillante for "Sheet Music Holder and Method for Playing an Instrument," discloses a sheet music holder for a drum kit suitable to provide sheet music to a drumhead so that the music may be read when the drum is played. The sheet music holder preserves the condition of the sheet music and is suitable to dampen the sound of the drum it is placed on. While the Squillante method may be directly applied to the instrument, it is not adaptable for use on a fretboard. It further does not offer the option of the student directly marking the note positions onto the instrument, which would reinforce the memory of the student and would provide for a more effective learning technique.

It is therefore an object of the present invention to provide an improved method of learning how to play a fretboard, by providing a method for marking visual cues directly on the surface of a fretboard.

It is a further object of the present invention to provide for a temporary application of such visual cues to the surface of the fretboard, so that a student may maximize the positions learned when playing music on the instrument.

It is a further object of the present invention to allow for maximum flexibility in the application of the markings, so that a student may most effectively learn the correct finger positions in playing music on the fretboard.

It is a further object of the present invention to provide a method wherein the visual cues may be temporarily applied to the fretboard without the use of a cumbersome piece of material that may hinder efficient learning of the fretboard.

It is a further object of the present invention to provide a method of learning how to play a fretboard wherein the visual cues may be applied to the fretboard without the use of an adhesive plastic or multiple pieces of adhesive material that would compromise the student's natural, correct feel of playing the instrument.

It is a further object of the present invention to provide a method wherein the visual cues may remain present on the surface of the fretboard for as long as the student requires, such that the student is not required to continually replace one or more of a series of cards, each marked to indicate the correct finger positions of a certain chord, when moving onto the process of learning the next appropriate chord.

SUMMARY OF THE INVENTION

The present invention provides a method and apparatus that achieves the above objectives by incorporating a markable, erasable surface onto the musical instrument. The student may use a writing utensil, such as an erasable marker, to draw the correct finger positions directly on the appropriate spots of the fretboard. Because the surface is also erasable, the student may alter the markings as desired throughout the process of learning how to play the instrument and the appropriate chord positions. The application of the markings directly onto the surface of the fretboard provides two key learning techniques for the student: first, to reinforce the appropriate positions through the act of drawing the positions onto the fretboard; and second, to provide an improved reference point (on the fretboard itself) of the correct finger positions for the student as he is playing the instrument.

BRIEF DESCRIPTION OF DRAWINGS

Reference will now be made to the drawings, wherein like parts are designated by like numerals, and wherein.

DETAILED DESCRIPTION OF THE INVENTION

Figure 1:
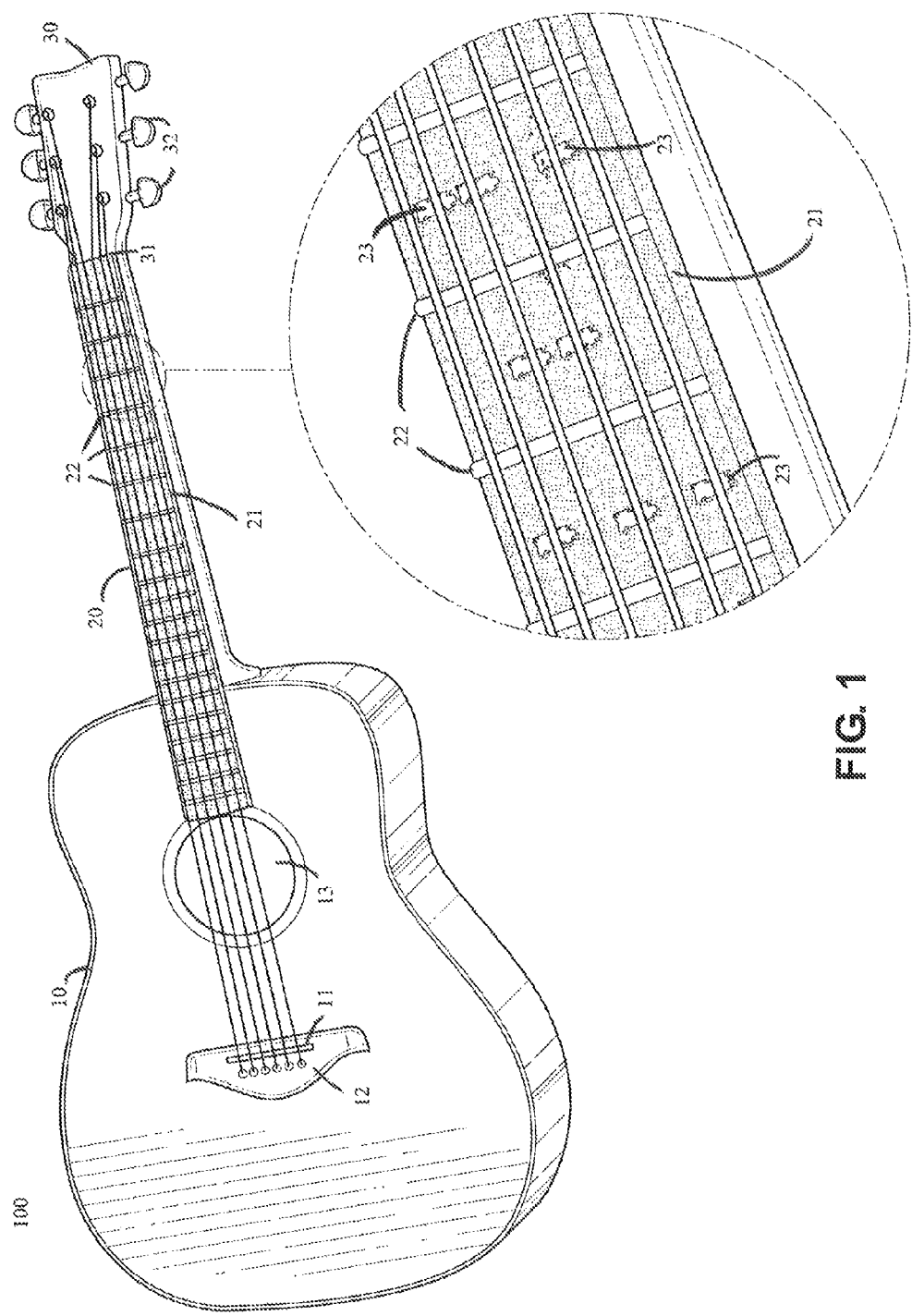
FIG. 1 is a perspective view of the present invention, featuring the removable markings on the surface of the fretboard, per the disclosure of the present invention.

Referring to FIGS. 1-4 generally, the figures depict a perspective view of the markable guitar 100 of the present invention. The markable guitar 100 generally features three separate sections: the body 10; the neck 20; and the headstock 30. The body 10 will typically include saddle 11, bridge 12, and sound hole 13. The neck 20 includes a fretboard (in the present invention, markable fretboard 21) and individual frets 22. Lastly, the headstock 30 typically includes nut 31 and tuners 32.

The markable guitar 100 of the present invention features markable fretboard 21. The surface of fretboard 21 itself is markable and erasable. This markable, erasable surface of fretboard 21 may be, in a preferred embodiment, constructed of chalkboard material. In an alternative embodiment, the markable, erasable surface of fretboard 21 may be constructed of whiteboard material. The surface of fretboard 21 is not limited to any one particular construction, but may feature any surface that is markable and erasable.

Due to the markable, erasable surface of fretboard 21 of the present invention, the fretboard 21 may display markings 23. Markings 23 may be applied by any erasable writing instrument that would be compatible with the markable, erasable surface of the fretboard 21, such as chalk or a dry erase marker. Markings 23 may be applied at any spot on the fretboard 21, and may generally correspond to correct finger positions for the appropriate chords the student is attempting to learn.

Figure 2:
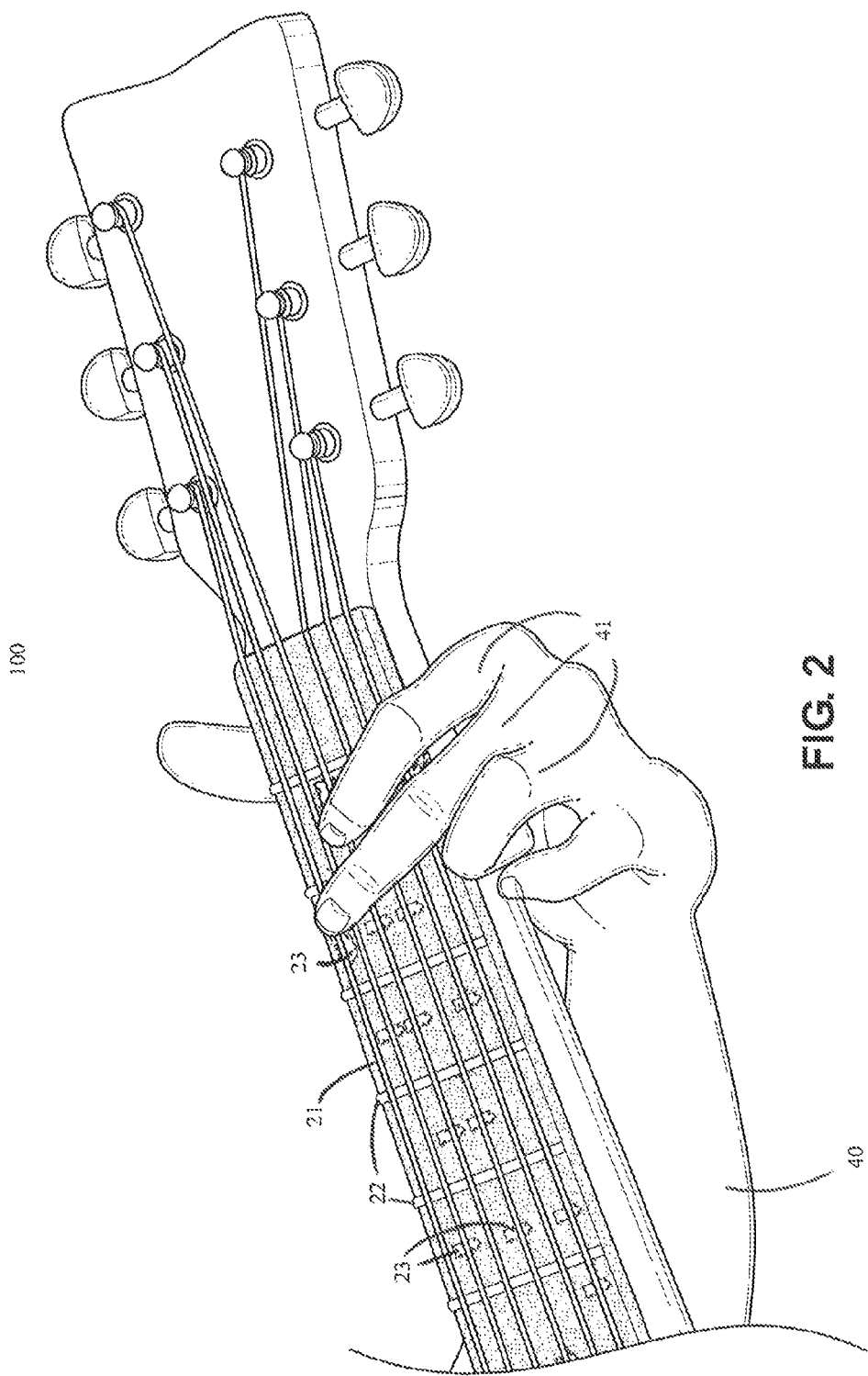
FIG. 2 is a perspective view of the present invention, featuring the fretboard in use by the student, per the disclosure of the present invention.

As depicted in FIG. 2, student 40 may use these markings 23 to correctly orient the appropriate placement of fingers 41 on the fretboard 21. FIGS. 1 and 2 depict multiple markings 23 present on the fretboard 21, but the student 40 may choose to place only a few markings 23 on the fretboard 21 at a time, to more effectively learn the correct finger positions corresponding to certain musical chords. Because of the markable, erasable surface of fretboard 21 of the present invention, any number of markings 23 may be made in any place on the surface of fretboard 21.

Figure 3:
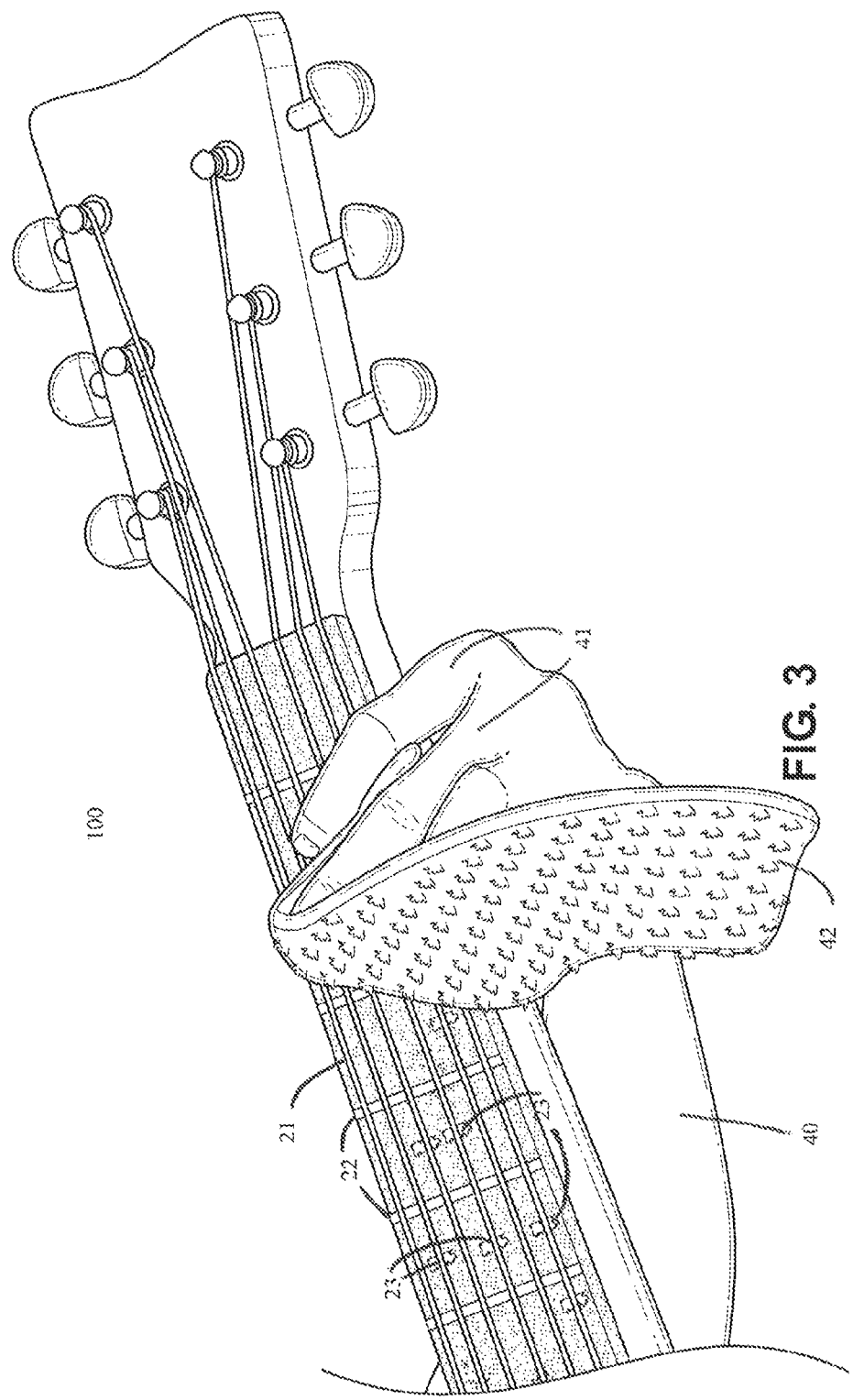
FIG. 3 is a perspective view of the present invention, featuring the student removing the markings from the surface of the fretboard, per the disclosure of the present invention.

As depicted in FIG. 3, markings 23 may be removed from the markable, erasable surface of fretboard 21 as the student so desires. Markings 23 may be removed from the markable, erasable surface of fretboard 21 by use of a rag 42, but may also be removed via any appropriate means, such as an eraser.

It may be appreciated from the foregoing that the incorporation of a markable, erasable surface into fretboard 21 of guitar 100 allows for an improved method of learning how to play the guitar. By use of such markings 23 directly on the fretboard 21 of guitar 100, the student 40 is better able to place his fingers 41 on the appropriate spot of guitar 100, and may more accurately visualize the correct finger positions corresponding to certain chords.

Figure 4:
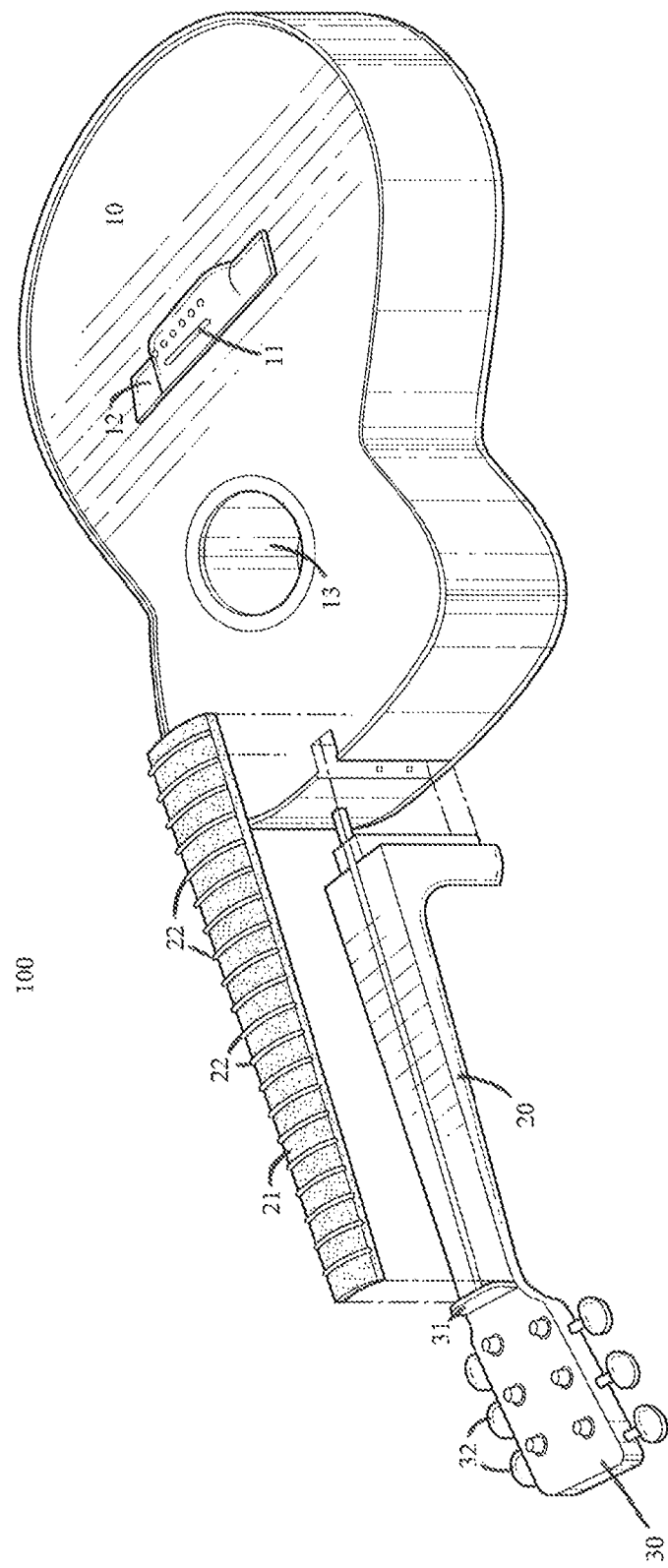
FIG. 4 is an exploded view of the present invention, displaying the portion of the fretboard that is comprised of a markable, erasable surface, per the disclosure of the present invention.

As shown in FIG. 4, the markable, erasable surface of fretboard 21 may be a separate construction that is built directly into the guitar 100. However, the markable, erasable surface of fretboard 21 may alternatively be created by other means, such as use of chalkboard paint. It is understood in the art that use of such chalkboard paint will convert almost any surface into a chalkboard. Application of such chalkboard paint to a fretboard 21 of guitar 100 would allow for removable markings 23 to be applied to the fretboard 21. The manner of creation of the markable, erasable surface of fretboard 21 is not meant to be limited by the described embodiments, but may be achieved by any manner known in the art.

Many changes and modifications can be made in the present invention without departing from the spirit thereof. I therefore pray that my rights to the present invention be limited only by the scope of the appended claims.

We claim:

1. A musical instrument comprising:
   (i) a markable surface;
   (ii) a body;
   (iii) a headstock; and
   (iv) a neck,
   wherein said neck further comprises a fretboard, said fretboard featuring a top layer comprising said markable surface, such that markings may be applied to said markable surface and removed from said markable surface as desired; and
   wherein said markable surface is made from a chalkboard material, such that chalk markings may be applied to said chalkboard material and removed from said chalkboard material as desired.

2. A musical instrument comprising:
   (i) a markable surface;
   (ii) a body;
   (iii) a headstock; and
   (iv) a neck,
   wherein said neck further comprises a fretboard, said fretboard featuring a top layer comprising said markable surface, such that markings may be applied to said markable surface and removed from said markable surface as desired; and
   wherein said markable surface comprises a whiteboard, such that a dry erase marker may apply said markings to said whiteboard surface and be removed from said whiteboard surface as desired.

3. A method of playing a musical instrument, comprising:
(i) using a musical instrument comprising:
(a) a body;
(b) a headstock; and
(c) a neck, wherein said neck further comprises a fretboard, wherein said fretboard comprises a top layer made of a markable surface;
(ii) applying removable markings to said markable surface of said fretboard; and
(iii) removing said removable markings from said markable surface of said fretboard as desired;
wherein said markings correspond to finger positions for playing said musical instrument; and
wherein said markable surface is made of a chalkboard material, such that chalk markings may be applied to said chalkboard material and removed from said chalkboard material as desired.

4. A method of playing a musical instrument, comprising:
(i) using a musical instrument comprising:
(a) a body;
(b) a headstock; and
(c) a neck, wherein said neck further comprises a fretboard, wherein said fretboard comprises a top layer made of a markable surface;
(ii) applying removable markings to said markable surface of said fretboard; and
(iii) removing said removable markings from said markable surface of said fretboard as desired;
wherein said markings correspond to finger positions for playing said musical instrument; and
wherein said markable surface is made of a whiteboard material, such that a dry erase marker may apply markings to said whiteboard material and be removed from said whiteboard material as desired.

5. A method of creating a musical instrument, said musical instrument comprising:
(i) a body;
(ii) a headstock; and
(iii) a neck, said neck further comprising:
(a) a fretboard, said fretboard featuring a top layer made of a markable surface, such that markings may be applied to said markable surface and removed from said markable surface as desired;
wherein said markable surface is comprised of a chalkboard material.

6. The method of claim 5, wherein chalk may apply said markings to said chalkboard material and be removed from said chalkboard material as desired.

7. A method of creating a musical instrument, said musical instrument comprising:
(i) a body;
(ii) a headstock; and
(iii) a neck, said neck further comprising:
(a) a fretboard, said fretboard featuring a top layer made of a markable surface, such that markings may be applied to said markable surface and removed from said markable surface as desired;
wherein said markable surface is comprised of a whiteboard material, such that a writing utensil compatible with said whiteboard material may apply said markings to said whiteboard material and be removed from said whiteboard material as desired.

* * * * *